United States Patent
Kadoya et al.

(10) Patent No.: US 10,691,122 B2
(45) Date of Patent: Jun. 23, 2020

(54) IN-VEHICLE SYSTEM

(71) Applicant: ALPINE ELECTRONICS, INC., Shinagawa-ku, Tokyo (JP)

(72) Inventors: Hidetoshi Kadoya, Fukushima (JP); Taro Iwamoto, Fukushima (JP); Shu Takahara, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 280 days.

(21) Appl. No.: 15/818,502

(22) Filed: Nov. 20, 2017

(65) Prior Publication Data

US 2018/0181122 A1 Jun. 28, 2018

(30) Foreign Application Priority Data

Dec. 27, 2016 (JP) .................. 2016-252717

(51) Int. Cl.
*G01C 22/00* (2006.01)
*G05D 1/00* (2006.01)
*G05D 1/02* (2020.01)
*B60K 35/00* (2006.01)
*B60K 37/06* (2006.01)

(52) U.S. Cl.
CPC .......... *G05D 1/0061* (2013.01); *B60K 35/00* (2013.01); *B60K 37/06* (2013.01); *G05D 1/021* (2013.01); *B60K 2370/143* (2019.05); *B60K 2370/16* (2019.05); *B60K 2370/175* (2019.05); *B60K 2370/188* (2019.05); *B60K 2370/195* (2019.05); *B60K 2370/197* (2019.05); *B60K 2370/334* (2019.05); *B60K 2370/349* (2019.05); *B60K 2370/52* (2019.05); *B60K 2370/70* (2019.05)

(58) Field of Classification Search
CPC ...... G05D 1/0061; G05D 1/021; B60K 35/00; B60K 2370/70; B60K 2370/143; B60K 2370/334; B60K 2370/197; B60K 2370/175; B60K 2370/16; B60K 2370/188; B60K 2370/349; B60K 2370/52; B60K 2370/195; B60K 37/06
USPC ................ 701/1, 31, 23; 345/156, 173, 184; 700/83
See application file for complete search history.

(56) References Cited

U.S. PATENT DOCUMENTS

| | | | | |
|---|---|---|---|---|
| 9,244,532 | B2* | 1/2016 | Olien | G06F 3/0416 |
| 2016/0207537 | A1* | 7/2016 | Urano | B60W 50/14 |
| 2016/0231743 | A1* | 8/2016 | Bendewald | B60W 50/0097 |
| 2017/0187963 | A1* | 6/2017 | Lee | G06F 3/013 |
| 2017/0282717 | A1* | 10/2017 | Jang | B60W 10/20 |
| 2017/0322760 | A1* | 11/2017 | Soh | B60R 11/0235 |
| 2018/0304750 | A1* | 10/2018 | Cieler | B60K 37/06 |

FOREIGN PATENT DOCUMENTS

JP 2015-130160 7/2015

* cited by examiner

*Primary Examiner* — Shardul D Patel
(74) *Attorney, Agent, or Firm* — Brinks Gilson & Lione

(57) ABSTRACT

When the automobile is changed to the manual driving mode, the control device starts acceptance as the operation of the touch pad as an operation on the application system that displays the screen on the heads-up display, and when the automobile is in the autonomous driving mode, the control device starts acceptance of the operation of the touch pad as an operation on the application system that displays the screen on the center display.

3 Claims, 5 Drawing Sheets

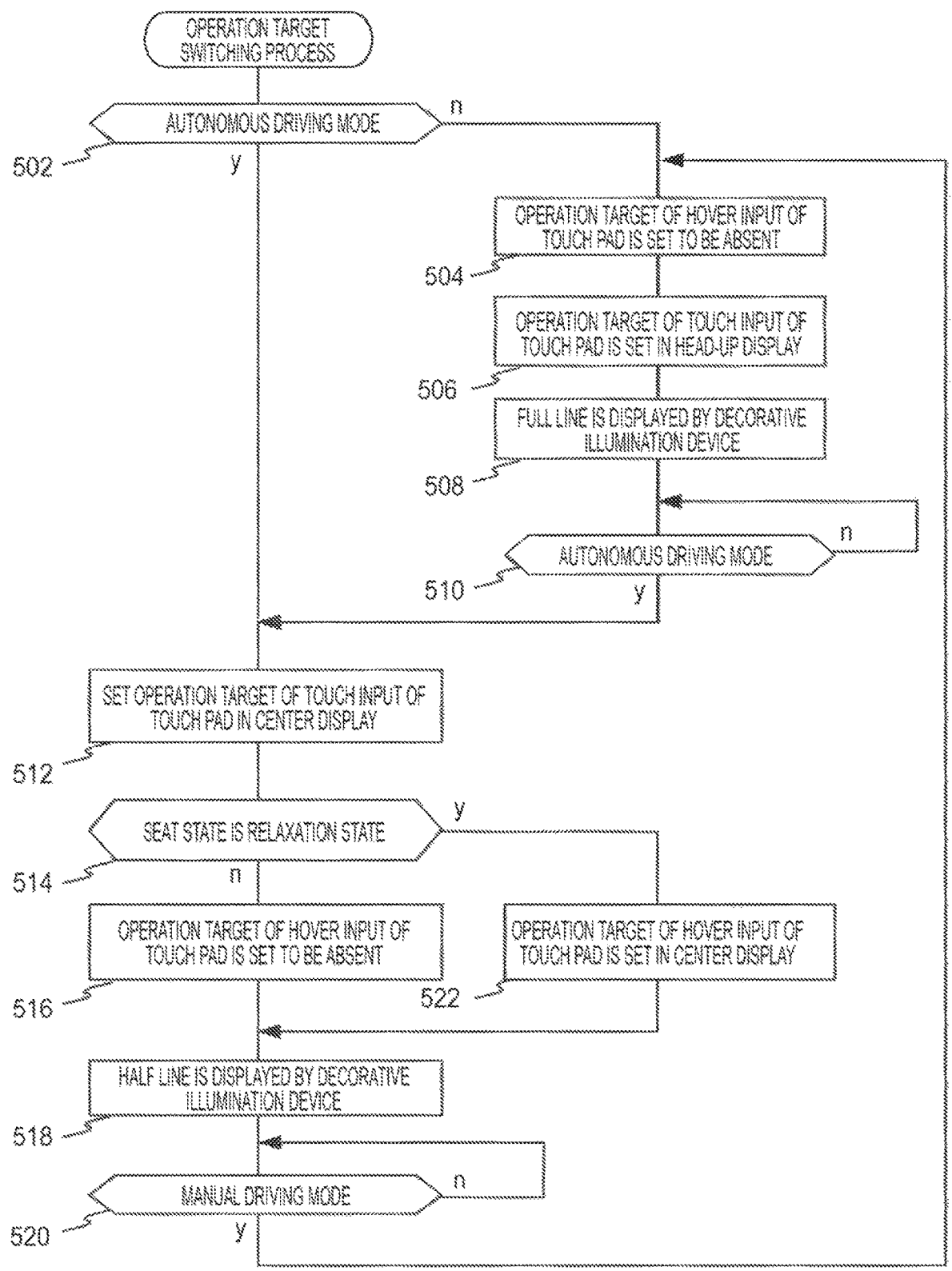

IN-VEHICLE SYSTEM

RELATED APPLICATIONS

The present application claims priority to Japanese Patent Appln. No. 2016-252717, filed Dec. 27, 2016, the entire disclosure of which is hereby incorporated by reference.

BACKGROUND

1. Field of the Disclosure

The present disclosure relates to an in-vehicle system including a plurality of displays.

2. Description of the Related Art

A technique is known for switching a display controlled by an input in an in-vehicle system having a plurality of displays, such as a display or a heads-up display, disposed in a center stack, and an input device such as a touch pad. In the technique, a display controlled by the operation of the input device is switched in accordance with a switch operation of a user, or an input of a voice command or a sight direction of the user. (See, for example, JP 2015-130160 A).

In the technique described above, when switching of a display controlled by an operation of an input device is performed in accordance with the sight direction of the user, a special device for detecting a sight direction of the user is required, and the sight direction of the user when operating the input device is restricted. On the other hand, when switching of the display controlled by the operation of the input device is performed by a switch operation or an input of a voice command, a complicated operation for switching is required each time the display used by the user is changed.

Accordingly, an object of the present disclosure is to alleviate the complication of a user's operation for switching a target of an operation performed from an input device when changing a display used by a user in an in-vehicle system including a plurality of displays.

SUMMARY

To address the issues described above, the present disclosure provides an in-vehicle system installed in an automobile that selectively performs autonomous driving and manual driving. The in-vehicle system may include: a plurality of displays, a processing unit that performs a plurality of processes, and an input device. In some implementations, each of the processes performs a motion according to an operation accepted as an operation of each process by the processing unit while using mutually different displays for the display output. The processing unit may accept an operation of the input device as an operation for different processes when the automobile performs autonomous driving and when the automobile performs manual driving.

In one aspect of the present disclosure, there is provided an in-vehicle system installed in an automobile which selectively performs autonomous driving and manual driving. The in-vehicle system may include: a first display, a second display, a processing unit configured to perform a first process and a second process; and an input device. In performing the first process, the processing unit is configured to perform a motion according to an operation accepted as an operation for the first process by the processing unit, while using the first display as a display output. In performing the second process, the processing unit is configured to perform a motion according to an operation accepted as an operation for the second process by the processing unit, while using the second display as a display output.

The processing unit is configured to operate in one or more operation acceptance modes, including, a first mode for accepting an operation of the input device as an operation of the first process, and a second mode for accepting an operation of the input device as an operation of the second process. When the automobile starts autonomous driving, the processing unit is configured to set the operation acceptance mode to the first mode, and when the automobile starts manual driving, the processing unit is configured to set the operation acceptance mode to the second mode.

Here, in such an in-vehicle system, the second display is, for example, a heads-up display which forms an image in front of a driver's seat of the automobile.

Further, the in-vehicle system may be configured so that the first display is disposed on a center stack or a dashboard of the automobile or the dashboard.

Further, the in-vehicle system may be configured so that the input device is disposed at a position beside a driver's seat of the automobile.

Further, the in-vehicle system may be configured to include a touch pad as the input device.

In some implementations, the touch pad provided as the input device may be a touch pad that is configured to accept a gesture operation performed at a position close to an upper part of the touch pad and a touch operation performed by touching the touch pad. The in-vehicle system may be provided with a detecting unit configured to detect at least one of a position in a front-rear direction of the driver's seat of the automobile or an inclination of a backrest as a driver's seat state. The processing unit may be configured to accept the touch operation as an operation of the first process when the operation acceptance mode is the first mode, and in the first mode, the processing unit may be configured to set whether to accept the gesture operation as the operation of the first process in accordance with the state of the driver's seat detected by the detecting unit.

Further, the above in-vehicle system may include a decorative illumination device that is configured to perform decorative illumination with two decorative illumination forms of a first decorative illumination form in which the input device and the first display are illuminated in a line shape, and a second decorative illumination form in which the input device and the second display are illuminated in a line shape. The processing unit may be configured to cause the decorative illumination device to perform decorative illumination according to the first decorative illumination form when the operation acceptance mode is the first mode, and to cause the decorative illumination device to perform the decorative illumination according to the second decorative illumination form when the operation acceptance mode is the second mode.

In implementations of an in-vehicle system, at the time of switching between manual driving and autonomous driving, among the plurality of processes using different displays in the display output, the process as the target of operation from the input device can be automatically switched. Therefore, at the time of switching to manual driving, it is possible to switch the process as the target of operation from the input device into a process in which a display with high probability of being used by the user during the manual driving is used for the display output. Further, at the time of switching to autonomous driving, it is possible to switch the process as the target of operation from the input device into a process in which a display with high probability of being used by the user during the autonomous driving is used for the display output.

Further, by doing so, it is possible to reduce the complication of the user's operation for switching the process as a target of operation from the input device when changing the display to be used with the switching between the autonomous driving and the manual driving.

As described above, according to the present invention, in an in-vehicle system including a plurality of displays, it is possible to reduce the complication of the user's operation for switching the target of the operation performed from the input device, when changing the display used by the user.

BRIEF DESCRIPTION OF THE DRAWINGS

FIG. 5 is a flowchart illustrating an operation target switching process; and

DETAILED DESCRIPTION OF THE DRAWINGS

Hereinafter, embodiments and implementations of the present disclosure will be described.

Figure 1:
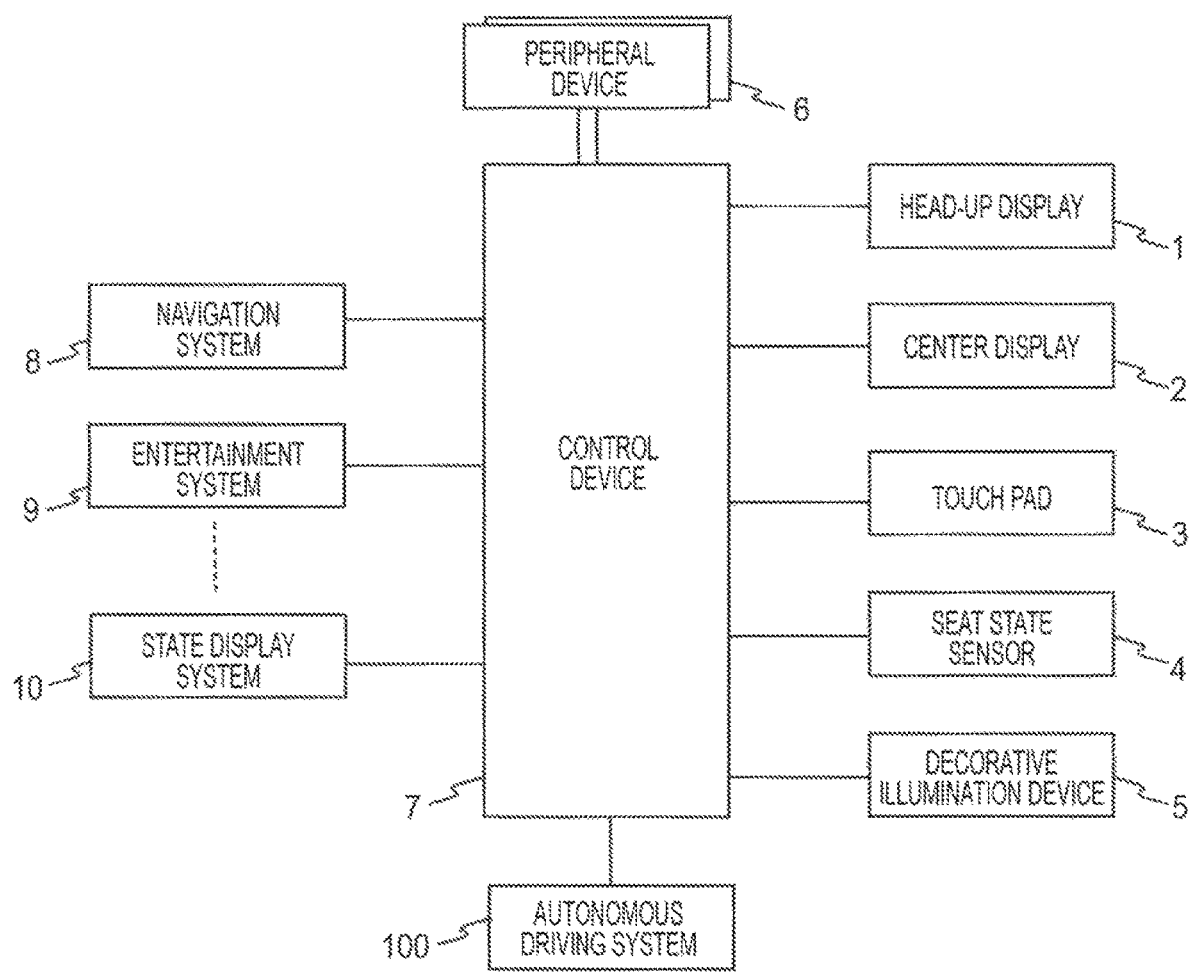
FIG. 1 is a block diagram illustrating a configuration of an in-vehicle system.

FIG. 1 illustrates a configuration of an in-vehicle system. The in-vehicle system is a system mounted on an automobile. As illustrated in the drawing, the in-vehicle system includes a heads-up display 1, a center display 2, a touch pad 3, a seat state sensor 4, a decorative illumination device 5, other peripheral devices 6, and a control device 7. Further, the in-vehicle system includes a plurality of application systems that operates under the control of the control device 7, such as a navigation system 8 which performs a route guidance using a map, an entertainment system 9 which performs playback and output of songs, and a state presentation system 10 which performs the display and output of various states relating to driving of an automobile such as the speed of the automobile.

Further, the control device 7 is connected to an autonomous driving system 100 that selectively performs the autonomous driving and the manual driving of the automobile.

Here, the autonomous driving system 100 includes an autonomous driving mode and a manual driving mode as driving modes. The autonomous driving mode is a driving mode in which the overall automatic control of various operations such as steering, braking, and acceleration is performed. The manual driving mode is a driving mode in which the overall automatic control of various operations such as steering, braking, and acceleration or an automatic control of a partial operation of the various operations is not performed.

The autonomous driving system 100 performs the automatic control of various operations such as steering, braking, and acceleration of the automobile in a form according to the driving mode, while switching the driving mode by the instruction of the user, or depending on the running situation or the surrounding situation.

When the manual driving mode is set as the driving mode, the user themself needs to monitor the surrounding traffic conditions and the user themself needs to perform the operation on the motion of the automobile in which the autonomous driving system 100 does not perform the automatic control. On the other hand, when the autonomous driving mode is set as the driving mode, the user does not need to operate the automobile and is also released from the necessity of monitoring the surrounding traffic conditions.

Figure 2A:
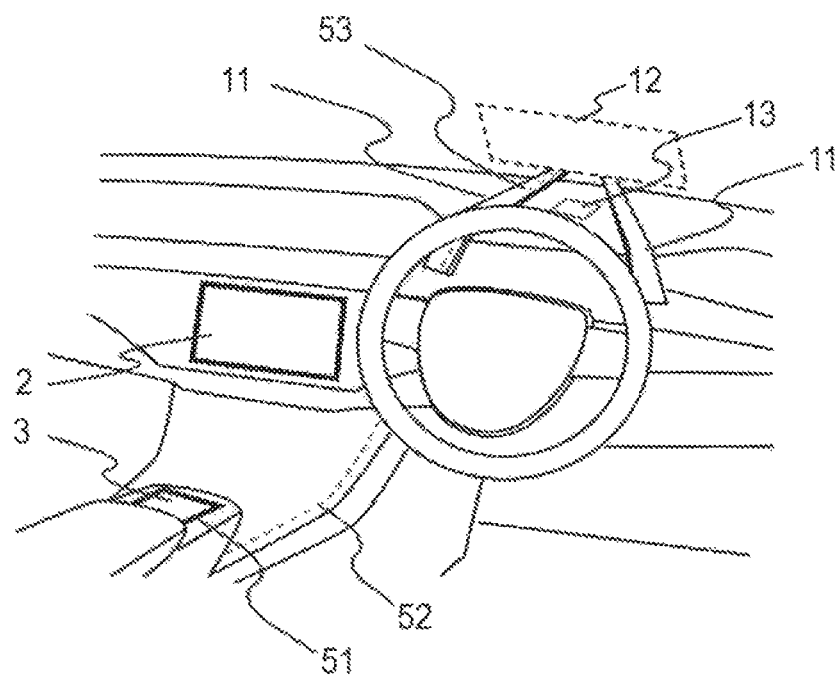
FIGS. 2A and 2B are diagrams illustrating an arrangement of a heads-up display, a center display, and a touch pad.
Figure 2B:
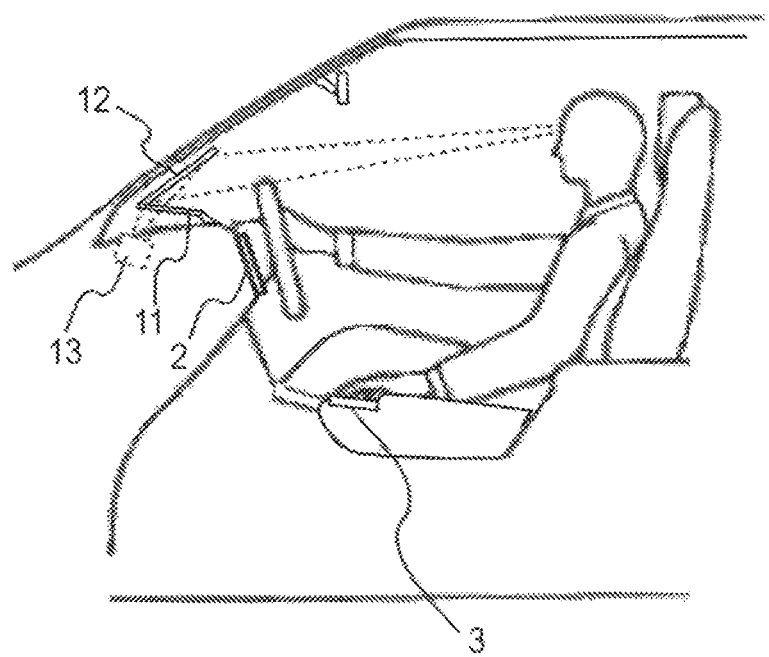

As illustrated in FIGS. 2A and 2B, the heads-up display 1 is a display which projects an image by the projection unit 13 on a combiner 12 disposed in a form supported by an arm 11 in front of a driver's seat. The image projected on the combiner 12 is visually recognized by a driver taking a driving attitude in the state of being superimposed on the forward scenery.

Further, the center display 2 is disposed in a center stack of the automobile. However, the center display 2 may be disposed at other positions of the dashboard or on the dashboard.

The touch pad 3 is disposed integrally with an armrest at the upper part of the center box of the automobile so that the driver can operate the touch pad, while maintaining the driver's posture. However, the touch pad 3 may be disposed at an arbitrary position as long as a position is near the driver's seat, such as the position on the door side beside the driver's seat.

The decorative illumination device 5 includes a first light-emitting device 51 that surrounds an edge of the touch pad 3 in a line shape, a second light-emitting device 52 extending from the center box to a position below the center display 2 on a center console, a third light-emitting device 53 extending linearly from a dashboard to a position just below the combiner 12 of the heads-up display 1 along the arm 11.

Figure 3:
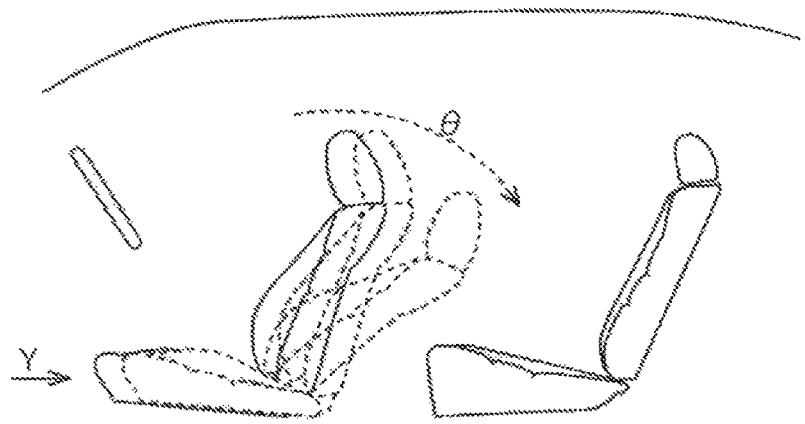
FIG. 3 is a diagram illustrating a state of a seat detected by a seat state sensor.

The seat state sensor 4 detects a position Y in a front-rear direction of the seat surface of the driver's seat illustrated in FIG. 3 and an angle θ (a reclining angle θ) of the backrest of the driver's seat. Further, the position Y in the front-rear direction becomes larger as the seat surface becomes the rear position, and the angle θ becomes larger as the backrest tilts backward.

The control device 7 controls the display of the heads-up display 1 or the center display 2 on the display screen that is output from application system.

Figure 4:
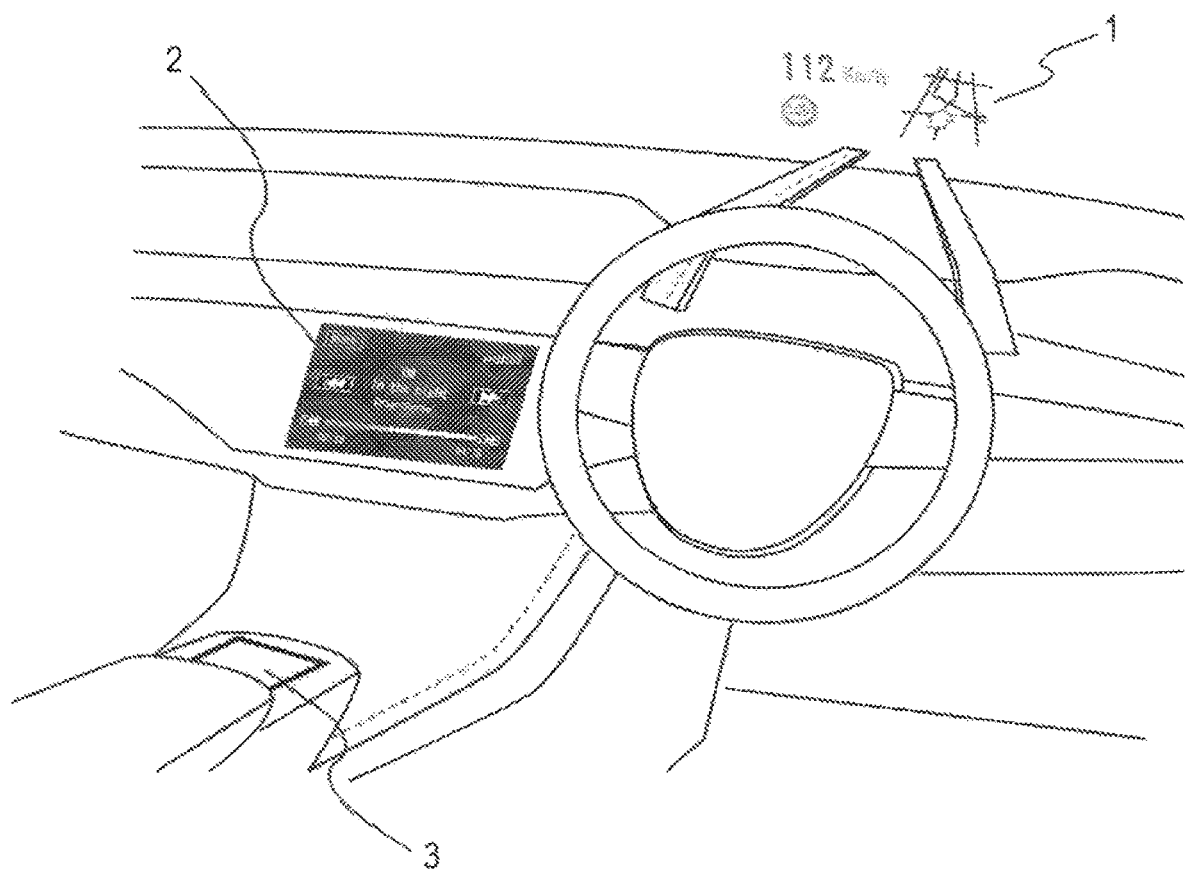
FIG. 4 is a diagram illustrating an example display of an in-vehicle system.

For example, as illustrated in FIG. 4, the control device 7 displays the screen that is output from the entertainment system 9 to the center display 2, or displays the screen that is output from the navigation system 8 or the state presentation system 10 to the heads-up display 1.

Further, in the example illustrated in FIG. 4, a player screen is displayed on the center display 2. The player screen presents musical piece information output from the entertainment system 9, and accepts operations related to musical piece playback. In the example illustrated in FIG. 4, a navigation screen and a speed display screen are displayed on the heads-up display 1. The navigation screen guides the traveling direction on the map that is output from the navigation system 8, and the speed display screen represents the vehicle speed that is output from the state presentation system 10 and the speed limit of the road on which the vehicle is traveling.

In such a configuration of the in-vehicle system, the control device 7 accepts the operation of the touch pad 3, as an operation of the application system that displays the screen on the display set as the operation target of the input type of operation of the generated touch pad 3 in the heads-up display 1 and the center display 2, and causes the motion corresponding to the operation generated in the application system to be performed.

In forms of the present disclosure, the touch pad 3 can accept a hover input which inputs a user operation by a gesture operation performed at a position close to the upper part of the touch pad 3 without touching the touch pad 3, as well as a touch input which inputs the user operation by a touch operation performed while touching the touch pad 3. Further, the input type of the above-described operation of the touch pad 3 is a hover input or a touch input.

More specifically, for example, in a case where the center display 2 is set as an operation target of the touch input and the above-described player screen is displayed on the center display 2, the touch operation of the touch pad 3 is accepted as an operation of the entertainment system 9 which outputs the player screen, and causes the entertainment system 9 to perform a motion corresponding to the operation. Similarly, when the center display 2 is set as an operation target of the hover input and the above-described player screen is displayed on the center display 2, the gesture operation performed by the hover input of the touch pad 3 is accepted as an operation of the entertainment system 9 that outputs the player screen, and causes the entertainment system 9 to perform a motion corresponding to the operation.

Further, for example, when the heads-up display 1 is set as an operation target of the touch input and the above-described navigation screen and the speed display screen are displayed on the heads-up display 1, the touch operation of the touch pad 3 is accepted as an operation of the application system to which the form of the accepted touch operation is assigned in advance, in the navigation system 8 that outputs the navigation screen and the state presentation system 10 that outputs the speed display screen, and the application system is caused to perform a motion corresponding to the operation.

That is, for example, when a flick operation, which is one mode of the touch operation of the touch pad 3, is assigned to the navigation system 8 as an operation for accepting an enlarged display instruction on the navigation screen of the navigation system 8, the flick operation is accepted as an operation of the navigation system 8, and the navigation system 8 is caused to perform the enlarged display motion of the navigation screen. Further, when the double tap operation, which is one mode of the touch operation of the touch pad 3, is assigned to the state presentation system 10 as an operation for accepting a switching instruction of display information of the state presentation system 10, a double tap operation is accepted as an operation of the state presentation system 10, and the state presentation system 10 is caused to perform a switching (for example, additional display of the engine speed) motion of the display information.

In some implementations, the control device 7 performs the following operation target switching process to set the display as the operation target of each input type (touch input and hover input) of the operation of the above-described touch pad 3.

FIG. 5 illustrates one implementations of a procedure of the operation target switching process.

As illustrated in the drawing, the control device 7 first checks whether the driving mode of the autonomous driving system 100 is the autonomous driving mode (step 502).

When the driving mode of the autonomous driving system 100 is not the autonomous driving mode, that is, when the driving mode is the manual driving mode (step 502), the operation target of the hover input of the touch pad 3 is set to be absent (step 504). Further, the operation target of the touch input of the touch pad 3 is set to the heads-up display 1 (step 506).

Figure 6A:
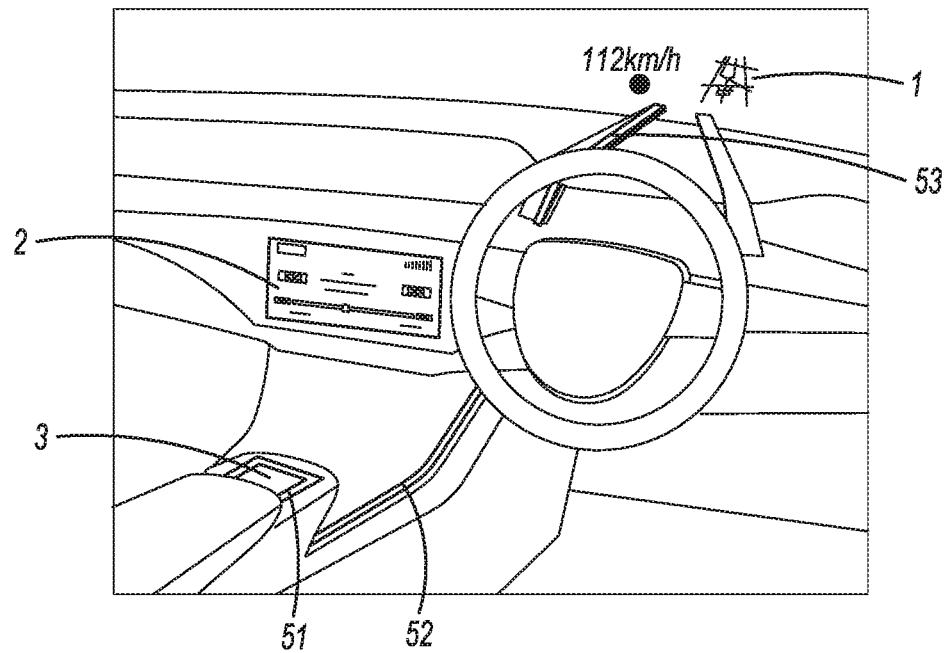
FIGS. 6A and 6B are diagrams illustrating aspects of a decorative illumination provided by a decorative illumination device.

Next, a full-line display using the decorative illumination device 5 is started (step 508). Here, the full-line display is a display that simulatively represents an aspect in which, as illustrated in FIG. 6A, all of a first light-emitting device 51, a second light-emitting device 52, and a third light-emitting device 53 are turned on, and the touch pad 3 and the heads-up display 1 are connected.

After waiting for a change of the driving mode of the autonomous driving system 100 to the autonomous driving mode (step 510), the process proceeds to step 512.

On the other hand, when it is determined in step 502 that the driving mode of the autonomous driving system 100 is the autonomous driving mode, the process proceeds to step 512.

After proceeding from step 502 or step 510 to step 512 as described above, the operation target of the touch input of the touch pad 3 is set to the center display 2 (step 506).

Next, it is checked whether or not the seat state is positioned in a relaxation state (step 514). Here, in step 514, it is determined whether the position Y in the front-rear direction of the seat surface of the driver's seat detected by the seat state sensor 4 is larger than a predetermined threshold value Thy, or the angle θ of the backrest of the driver's seat is larger than a predetermined threshold value Thθ, it is determined that the seat state is in the relaxation state. Incidentally, as the threshold value Thy, if the position Y in the front-rear direction of the seat surface further increases, a size that is unsuitable for driving of the automobile is set. As the threshold value Thθ, if the angle θ of the backrest of the driver's seat further increases, a size that is not suitable for driving the vehicle is set. That is, as the threshold value Thy and the threshold value Thθ, when the position Y in the front-rear direction of the seat surface or the backrest angle θ of the driver's seat further increases, a value capable of estimating that the user of the driver's seat is in a relaxed posture is set.

If the seat state is not positioned in the relaxation state (step 514), the operation target of the hover input of the touch pad 3 is set to be absent (step 516).

Figure 6B:
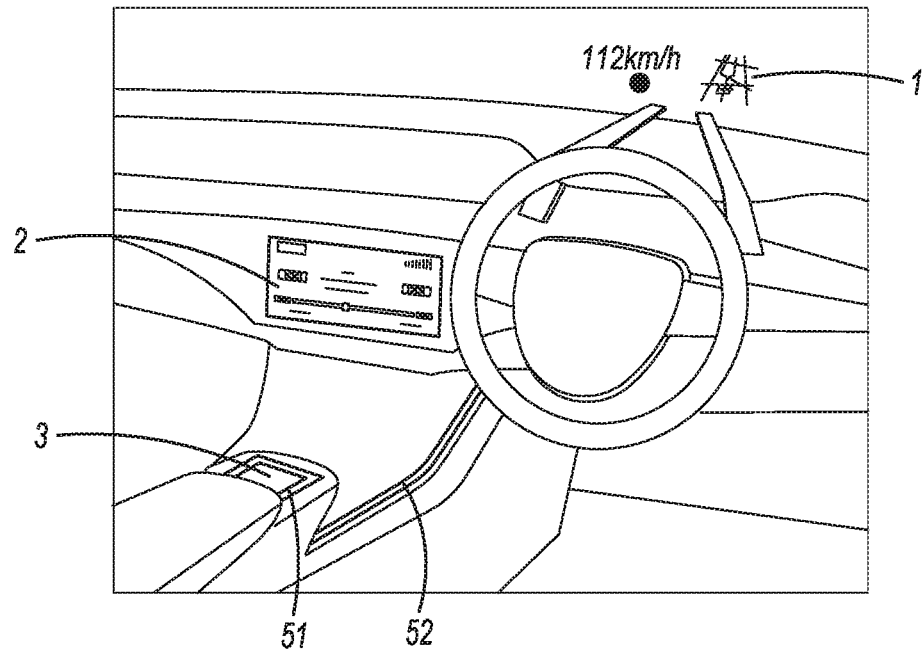

The half-line display using the decorative illumination device 5 starts (step 518). Here, as illustrated in FIG. 6B, the half-line display is a display that simulatively represents an aspect in which only the first light-emitting device 51 and the second light-emitting device 52 are turned on and the touch pad 3 and the center display 2 are connected.

After waiting for the driving mode of the autonomous driving system 100 to change to the manual driving mode (step 520), the process proceeds to step 504.

On the other hand, if it is determined in step 514 that the seat state is positioned in the relaxation state, the operation target of the hover input of the touch pad 3 is set to the center display 2 (step 522).

The half-line display using the decorative illumination device 5 starts (step 518), and after waiting for the driving mode of the autonomous driving system 100 to change to the manual driving mode (step 520), the process proceeds to step 504.

The operation target switching process performed by the control device 7 has been described above.

In implementations of the operation target switching process described above, when the automobile is in the manual driving mode, the user of the driver's seat can operate the application system that displays the screen on the heads-up display 1, by the touch operation of the touch pad 3.

On the other hand, when the automobile is in the autonomous driving mode, the user of the driver's seat can operate the application system that displays the screen on the center display 2, by the touch operation of the touch pad 3. Furthermore, when the automobile is in the autonomous driving mode and the user of the driver's seat is in a relaxed posture by lowering the seat backward or tilting the backrest, in addition to the touch operation of the touch pad 3, even with the hover operation of the touch pad 3, the user of the driver's seat can operate the application system that displays the screen on the center display 2.

Here, at the time of the manual driving, the heads-up display 1 which can be visually recognized while visually observing the front is a display suitable for use by the driver, but at the time of the autonomous driving, the center display 2 which can be visually recognized in a more relaxed posture is a display suitable for use by the driver.

The heads-up display is usually used for displaying information that contributes to driving of the automobile, and the display for entertainment is often performed by the center display 2.

Therefore, the display used by the user of the driver's seat when the user of the driver's seat performs the manual driving in the manual driving mode is the heads-up display 1, and it is highly probable that the application system in which the user of the driver's seat desires to operate is an application system that displays a screen on the heads-up display 1. On the other hand, the display used by the user of the driver's seat when the vehicle is in the autonomous driving mode and released from the driving and in a free state is the center display 2, and it is highly probable that the application system in which the user of the driver's seat desires to operate is an application system that displays a screen on the center display 2.

In forms of the present disclosure described above, when the driving mode is switched, the application system capable of being operated with the touch pad 3 is automatically switched into an application system which displays the screen on the heads-up display 1 when the application system capable of being operated is in the manual driving mode, and into an application system which displays the screen on the center display 2 when the application system is in the autonomous driving mode.

Therefore, it is possible to reduce, if not eliminate, the necessity of performing a complicated operation of switching the application system capable of being operated with the touch pad 3 as the user of the driver's seat changes the display to be used at the time of switching the driving mode.

Embodiments and implementations of the present disclosure have been described above.

In forms of the above embodiment and implementations, only when the automobile is in the autonomous driving mode and the seat state is positioned in the relaxation state in the operation target switching process, the operation target of the hover input of the touch pad 3 is set to the center display 2. However, when the automobile is in the autonomous driving mode, the operation target of the hover input of the touch pad 3 may be always set to the center display 2.

In forms of the embodiments and implementations described above, when the automobile is in the manual driving mode in the operation target switching process, the operation target of the hover input of the touch pad 3 is set to be absent. However, when the automobile is in the manual driving mode, the operation target of the hover input of the touch pad 3 may be set to the heads-up display 1.

Further, in forms of the embodiments and implementations described above, the center display 2 is a display having a touch panel, in the control device 7, the touch operation of the touch panel of the center display 2 is accepted as the operation to the application system that displays the screen on the center display 2 only at the time of the autonomous driving mode, and the application system may be caused to perform a motion corresponding to the operation. Alternatively, in the control device 7, both in the autonomous driving mode and in the manual driving mode, the touch operation of the touch panel of the center display 2 may be accepted as the operation of the application system that displays the screen on the center display 2 and the application system may be caused to perform the motion corresponding to the operation.

Further, in forms of the embodiments and implementations described above, the touch pad 3 is used as the input device disposed at the hand of the user of the driver's seat, but another input device may be disposed at the hand of the user at the driver's seat and used instead of the touch pad 3.

Further, in forms of the embodiments and implementations described above, the setting of the display to be operated on each input type (touch input and hover input) of the operation of the touch pad 3 may be changed at any time to the display selected by the user by a predetermined operation.

It is therefore intended that the foregoing detailed description be regarded as illustrative rather than limiting, and that it be understood that it is the following claims, including all equivalents, that are intended to define the spirit and scope of this disclosure.

What is claimed is:

1. An in-vehicle system installed in an automobile configured to selectively perform autonomous driving and manual driving, the in-vehicle system comprising:
   a first display disposed on a center stack or a dashboard of the automobile;
   a second display comprising a heads-up display which forms an image in front of a driver's seat of the automobile;
   a processing unit configured to perform a first process and a second process;
   an input device comprising a touch pad, wherein the touch pad is configured to accept a gesture operation performed at a position close to an upper part of the touch pad and to accept a touch operation performed by touching the touch pad; and
   a detecting unit configured to detect, as a driver's seat state, a position in a front-rear direction of the driver's seat of the automobile and an inclination of a backrest of the driver's seat,
   wherein in performing the first process, the processing unit is configured to perform a motion according to an operation accepted as an operation for the first process by the processing unit, while using the first display as a display output,
   wherein in performing the second process, the processing unit is configured to perform a motion according to an operation accepted as an operation for the second process by the processing unit, while using the second display as a display output,
   wherein the processing unit is configured to operate in one or more operation acceptance modes including:
      a first mode for accepting an operation of the input device as an operation of the first process, and a second mode for accepting an operation of the input device as an operation of the second process, wherein when the automobile starts autonomous driving, the processing unit is configured to automatically set the operation acceptance mode to the first mode, and when the automobile starts a manual driving, the processing unit is configured to automatically set the operation acceptance mode to the second mode; and wherein the processing unit is configured to accept the touch operation as an operation of the first process when the operation acceptance mode is the first mode, and wherein in the first mode, the processing unit is configured to set whether to accept the gesture operation as the operation of the first process in accordance with the state of the driver's seat detected by the detecting unit.

2. The in-vehicle system according to claim 1, wherein the input device is disposed at a position beside a driver's seat of the automobile.

3. The in-vehicle system according to claim 1, further comprising:

a decorative illumination device configured to perform decorative illumination with two decorative illumination forms including:

a first decorative illumination form in which the input device and the first display are illuminated in a line shape, and a second decorative illumination form in which the input device and the second display are illuminated in a line shape, wherein the processing unit is configured to cause the decorative illumination device to perform decorative illumination according to the first decorative illumination form when the operation acceptance mode is the first mode, and to cause the decorative illumination device to perform the decorative illumination according to the second decorative illumination form when the operation acceptance mode is the second mode.

* * * * *